(12) United States Patent
Fukuyama

(10) Patent No.: US 7,711,895 B2
(45) Date of Patent: May 4, 2010

(54) STORAGE DEVICE, DATA ARRANGEMENT METHOD AND PROGRAM

(75) Inventor: Osanori Fukuyama, Tokyo (JP)

(73) Assignee: NEC Corporation, Tokyo (JP)

( * ) Notice: Subject to any disclaimer, the term of this patent is extended or adjusted under 35 U.S.C. 154(b) by 442 days.

(21) Appl. No.: 11/689,846

(22) Filed: Mar. 22, 2007

(65) Prior Publication Data

US 2007/0233948 A1 Oct. 4, 2007

(30) Foreign Application Priority Data

Mar. 29, 2006 (JP) ............... 2006-092321

(51) Int. Cl.
*G06F 12/00* (2006.01)
(52) U.S. Cl. ...................... 711/113; 711/162
(58) Field of Classification Search ........................ None
See application file for complete search history.

(56) References Cited

U.S. PATENT DOCUMENTS 6,148,368 A * 11/2000 DeKoning ................... 711/113
7,376,785 B2 * 5/2008 Katsuragi et al. ........... 711/112

FOREIGN PATENT DOCUMENTS

JP 2001-134487 A 5/2001

* cited by examiner

*Primary Examiner*—Hiep T Nguyen
(74) *Attorney, Agent, or Firm*—Dickstein, Shapiro, LLP.

(57) ABSTRACT

A storage device, a data arrangement method and a computer program are disclosed, in which the redundancy is maintained even if a cache module runs out of order, and the deterioration of the write processing performance is prevented at the time of failure of the cache memory module. When cache 0 fails while cache 0 and cache 1 possess duplicate data that is not stored in disks, data of cache 0 is copied onto data of cache 4 that is synchronized with the disks.

6 Claims, 2 Drawing Sheets

STORAGE DEVICE, DATA ARRANGEMENT METHOD AND PROGRAM

BACKGROUND OF THE INVENTION

1. Field of the Invention

This invention relates to a technique for preventing loss of redundancy and performance deterioration of a writing process in a storage device having a plurality of cache memory modules.

2. Description of the Related Art

In the conventional storage device, a method is available to guarantee redundancy by a complete mirroring technique for a cache module.

A disk array device includes a plurality of disk modules for storing data, a plurality of memory modules for temporarily storing data at the time of writing or reading the data to and from the disk modules, and a plurality of director modules for controlling write or read operations, wherein the first and third memory modules are paired and so are the second and fourth memory modules. Upon occurrence of a fault in any one of the first to fourth memory modules, the first write data is written in paired one of the remaining memory modules by the director modules. Further, a cache management area is set in the two of the remaining memory modules. For the disk array device, therefore, a technique has been proposed in which the data write process is executed at high speed while at the same time avoiding data loss (Japanese Patent Application No. 2001-134487).

The conventional method poses a problem, however, that once any one of the cache modules fails, the redundancy is lost and the performance greatly deteriorates.

Specifically, in FIG. 1, in the case where cache 0 fails, cache data 0 in cache 1 becomes non-redundant. Next, in order to prevent the loss of cache data 0 at the time of failure of cache 1, the operation of cache 1 is suspended after writing cache data 0 into a disk.

As a result, only caches 2 and 3 are available for use, thereby greatly lowering both the read and write performance.

SUMMARY OF THE INVENTION

This invention has been developed to solve this problem, and the objective thereof is to divide cache data into the data requiring redundancy and the data requiring no redundancy, and by appropriately designing a data arrangement method, the redundancy is maintained and the performance deterioration of the write operation is prevented even when a cache module fails.

In order to achieve the objective described above, there is provided a storage device comprising a first cache memory module and a second cache memory module having duplicate data not stored in a disk drive device, and third cache memory module that is synchronized with the disk device, wherein if one of the first and second cache memory modules fails, data of a failed cache memory module is copied onto data of the third cache memory module.

There is also provided a storage device comprising a first cache memory module and a second cache memory module having duplicate data not being stored in a disk drive device, and a third cache memory module and a fourth cache memory module that are synchronized with the disk drive device, wherein if one of the first and second cache memory modules fails, data items of a failed cache memory module are distributed and copied onto data of the third and fourth cache memory modules.

There is also provided a data arrangement method for a storage device comprising a first cache memory module and a second cache memory module having duplicate data not being stored in a disk drive device, wherein if one of the first and second cache memory modules fails, data of a failed cache memory module is copied onto data of the third cache memory module.

There is also provided a data arrangement method for a storage device comprising a first cache memory module and a second cache memory module having duplicate data not being stored in a disk drive device, and a third cache memory module and a fourth cache memory module that are synchronized with the disk drive device, wherein if one of the first and second cache memory modules fails, data items of a failed cache memory module are distributed and copied onto data of the third and fourth cache memory modules.

There is provided a computer program for a storage device comprising a first cache memory module and a second cache memory module having duplicate data not being stored in a disk drive device, the program causing a computer to copy, if one of the first and second cache memory modules fails, data of a failed cache memory module onto data of the third cache memory module.

There is also provided a computer program for a storage device comprising a first cache memory module and a second cache memory module having duplicate data not being stored in a disk drive device, and a third cache memory module and a fourth cache memory module that are synchronized with the disk drive device, the program causing a computer to distribute and copy, if one of the first and second cache memory modules fails, data items of a failed cache memory module onto data of the third and fourth cache memory modules.

According to this invention, even if a cache memory module runs out of order, the redundancy can be maintained and at the same time the deterioration of writing processing performance is prevented in spite of failure of the cache memory module.

DESCRIPTION OF THE PREFERRED EMBODIMENTS

A first embodiment is explained in detail below with reference to the drawings.

Generally, data is written only into the cache memory module but not into a disk drive device (disks) in order to increase the writing speed. In the process, the data unwritten into the disk are existent on the cache memory module and copied to avoid loss of the data due to failure or the like.

Figure 1:
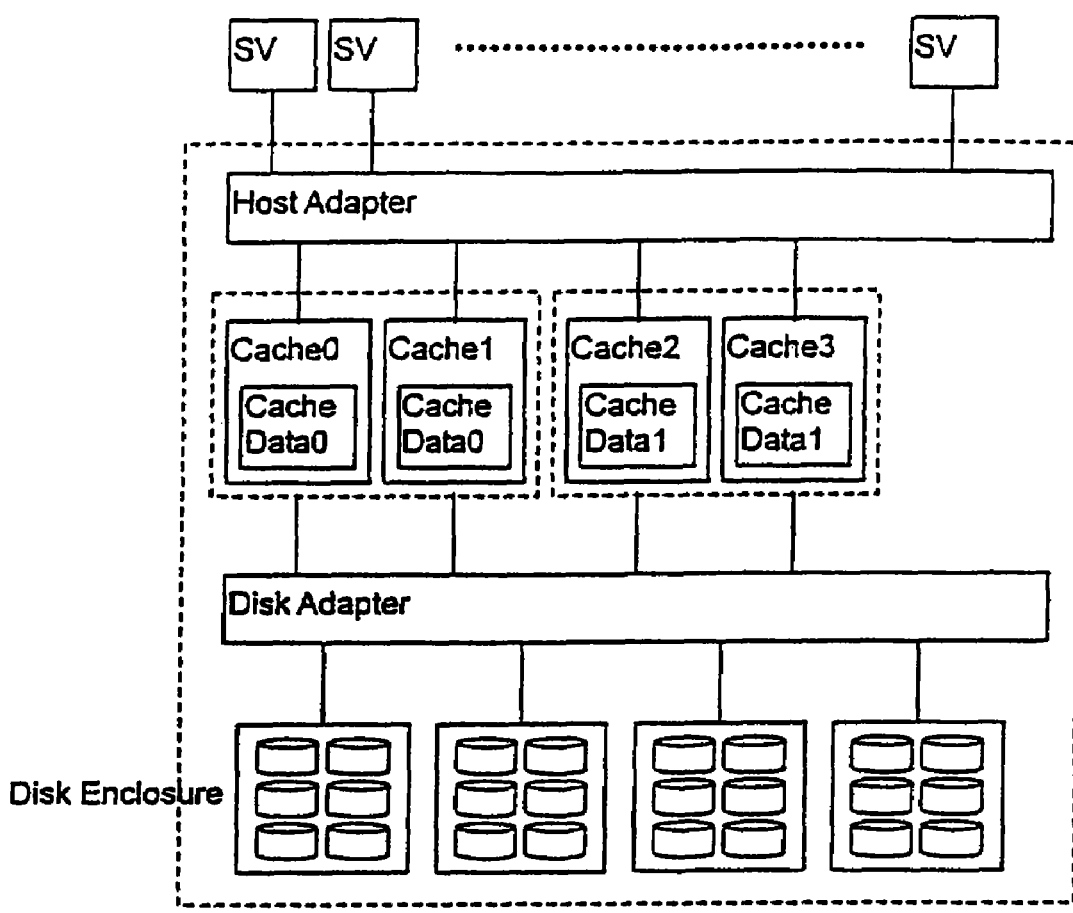
FIG. 1 is a diagram showing a data arrangement and configuration of a conventional storage device.
Figure 2:
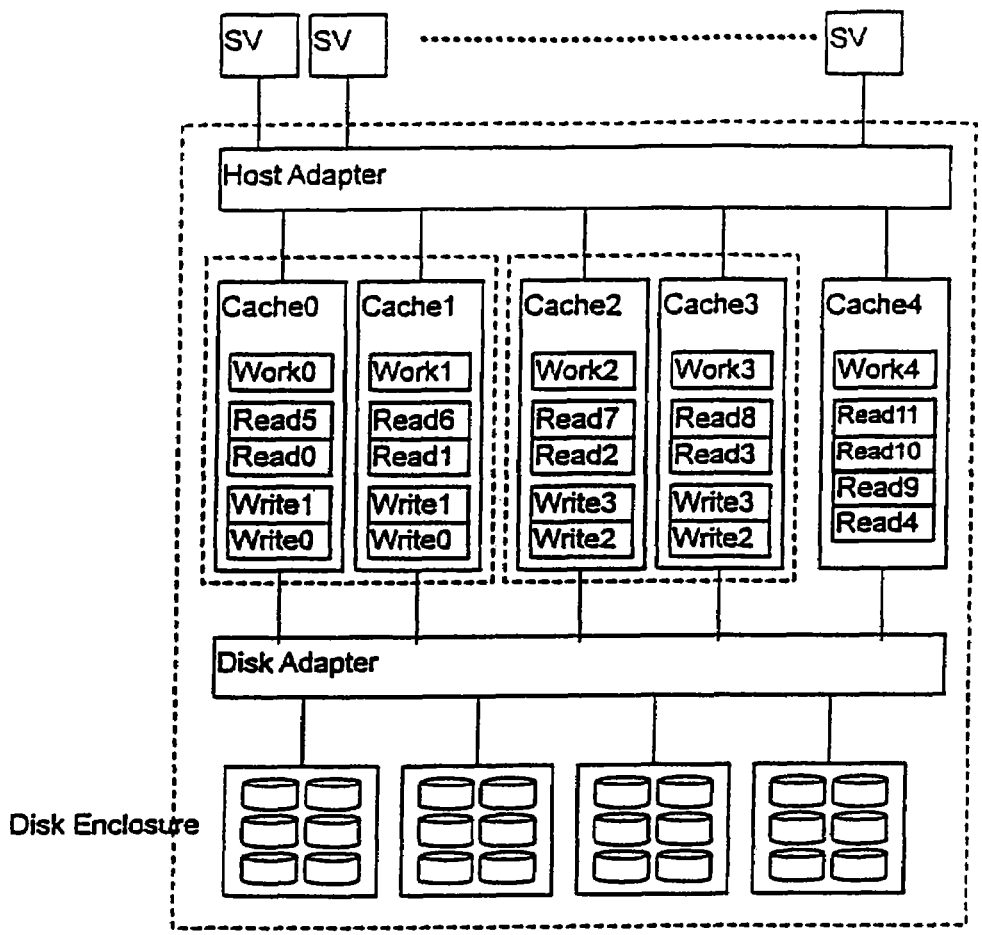
FIG. 2 is a diagram showing a data arrangement and configuration of a storage device according to a first embodiment.

A storage device having a plurality of cache memory modules according to this embodiment, as shown in FIG. 2, includes five cache memory modules, where cache 0 and cache 1 have duplicate data (write 0, write 1) unwritten into the disk, and so do cache 2 and cache 3 (write 2, write 3).

The cache 4 is not mirrored to other cache memory modules. In the drawings, "read" designates the data synchronized with the disk. The "read" data is not copied since the data is restorable from the disk even if the cache memory module fails.

The "work" data, on the other hand, designates temporary data used only once for parity calculation at the time of a read or write operation of the disk having a RAID configuration and not copied since the data is restorable from the disk even if the cache memory module fails.

Next, an operation of this embodiment is explained.

Assume here that cache 0 fails. The unwritten data of write 0 and write 1 of cache 1 lose the redundancy immediately after the failure. The redundancy is secured, however, by copying write 0 and write 1 of cache 1 to cache 4. As a result, the read 4 and read 9 of cache 4 are overwritten and the data are lost. However, since the data is being stored in the disk, the loss poses no problem. In this way, the data (write 0, write 1) in cache 1 and cache 4 unwritten into the disk are duplicated, and therefore, the redundancy is maintained.

When a method of the embodiments is not employed, the data not copied is required to be written into the disk. This process, together with the reduction in an unwritten area, lowers the write processing performance.

A cache memory module is copied at high speed and the capacity of an unwritten area is maintained whereby the deterioration of the write processing performance is prevented.

This also holds true even when cache 1, cache 2 or cache 3 fail.

Incidentally, cache 4 stores only read data that do not require redundancy. Therefore, even if cache 4 fails, the redundancy is not influenced and the write processing performance does not go down.

Next, a second embodiment is explained in detail with reference to the drawings.

Figure 3:
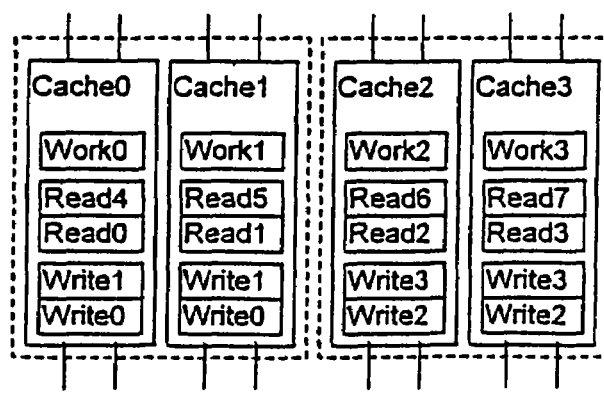
FIG. 3 is a diagram showing a data arrangement and configuration of a storage device according to a second embodiment.

A device includes four cache modules. In FIG. 3, if cache 0 fails, the unwritten data of write 0 and write 1 on cache 0 lose redundancy immediately after the failure. The redundancy is secured, however, by copying write 0 of cache 1 to cache 2, and write 1 of cache 2 to cache 3. As a result, the read 2 on cache 2 and the read 3 on cache 3 are overwritten. However, the loss occurs no problem since the data are being kept in the disk.

Consequently, the redundancy of write 0 and write 1 on cache 1 not written in the disk can be secured.

When a method according to the embodiments is not employed, the data of write 0 and write 1 on cache 1 that have lost the redundancy must be written onto the disk. The related process and the reduction of an available area deteriorate the writing process performance.

A cache memory module is copied at high speed and the capacity of the unwritten area is maintained whereby the deterioration of the write processing performance is prevented.

Incidentally, this also holds true in the case where cache 1, cache 2 or cache 3 fail from a normal state.

Each embodiment described above is a preferred one of the invention, and can be variously modified within the scope not departing from the spirit of the invention. For example, the process of realizing the functions of the device can be executed by reading a program for realizing the functions of the storage device into the device. Further, the program can be transmitted to other computer systems through a computer readable recording medium such as a CD-ROM or a magnetic optical disk, or through a propagation medium such as the Internet or a telephone line.

What is claimed is:

1. A storage device comprising:
    a first cache memory module and a second cache memory module that store duplicate data not being stored in a disk drive device;
    a third cache memory module that is synchronized with the disk drive device;
    wherein if one of the first and second cache memory modules fails, data of a failed cache memory module is copied onto data of the third cache memory module.

2. A storage device comprising:
    a first cache memory module and a second cache memory module that store duplicate data not being stored in a disk drive device; and
    a third cache memory module and a fourth cache memory module that are synchronized with the disk drive device.
        wherein if one of the first and second cache memory modules fails, data items of a failed cache memory module are distributed and copied onto data of the third and fourth cache memory modules.

3. A data arrangement method for a storage device comprising a first cache memory module and a second cache memory module storing duplicate data that are not stored in a disk drive device, and a third cache memory module that is synchronized with the disk drive device,
    wherein if one of the first and second cache memory modules fails, data of a failed cache memory module is copied onto data of the third cache memory module.

4. A data arrangement method for a storage device comprising a first cache memory module and a second cache memory module storing duplicate data that are not stored in a disk drive device, and a third cache memory module and a fourth cache memory module that are synchronized with the disk drive device,
    wherein if one of the first and second cache memory modules fails, data items of a failed cache memory module are distributed and copied onto data of the third and fourth cache memory modules.

5. A computer-readable medium storing a computer program for a storage device comprising a first cache memory module and a second cache memory module that store duplicate data not being stored in a disk drive device, and a third cache memory module that is synchronized with the disk drive device, the program causing a computer to perform
    copying, if one of the first and second cache memory modules fails, data of a failed cache memory module onto data of the third cache memory module.

6. A computer-readable medium storing a computer program for a storage device comprising a first cache memory module and a second cache memory module that store duplicate data not being stored in a disk drive device, and a third cache memory module and a fourth cache memory module that are synchronized with the disk drive device, the program causing a computer to perform
    distributing and copying, if one of the first and second cache memory modules fails, data items of a failed cache memory module onto data of the third and fourth cache memory modules.

* * * * *